United States Patent
Li et al.

(12)

(10) Patent No.: US 11,143,000 B2
(45) Date of Patent: Oct. 12, 2021

(54) MOBILE POWER GENERATION SYSTEM

(71) Applicant: YANTAI JEREH PETROLEUM EQUIPMENT & TECHNOLOGIES CO., LTD., Yantai (CN)

(72) Inventors: Xin Li, Yantai (CN); Ning Feng, Yantai (CN); Tao Zhang, Yantai (CN); Ting Zhang, Yantai (CN); Libin Zhou, Yantai (CN); Wanchun Zha, Yantai (CN); Lili Wang, Yantai (CN)

(73) Assignee: YANTAI JEREH PETROLEUM EQUIPMENT & TECHNOLOGIES CO. LTD., Yantai (CN)

( * ) Notice: Subject to any disclaimer, the term of this patent is extended or adjusted under 35 U.S.C. 154(b) by 0 days.

(21) Appl. No.: 16/837,105

(22) Filed: Apr. 1, 2020

(65) Prior Publication Data

US 2020/0408071 A1 Dec. 31, 2020

(30) Foreign Application Priority Data

Jun. 25, 2019 (CN) .......................... 201910552761.0

(51) Int. Cl.
*E21B 41/00* (2006.01)
*F01D 15/10* (2006.01)
(Continued)

(52) U.S. Cl.
CPC .......... *E21B 41/0085* (2013.01); *F01D 15/10* (2013.01); *F01D 25/30* (2013.01); *H02K 7/1823* (2013.01)

(58) Field of Classification Search
CPC ...... E21B 41/0085; F01D 15/10; F01D 25/30; H02K 7/1823
(Continued)

(56) References Cited

U.S. PATENT DOCUMENTS 3,453,443 A * 7/1969 Stoeckly ................... F02C 6/02
290/2
3,536,928 A * 10/1970 Jones, Jr. ................ F02B 63/04
290/1 B
(Continued)

FOREIGN PATENT DOCUMENTS

| CN | 205206965 U | 5/2016 |
|---|---|---|
| CN | 107208557 A | 9/2017 |
| WO | 2018096233 A1 | 5/2018 |

OTHER PUBLICATIONS

PCT, International Search Report and Written Opinion of the International Searching Authority in PCT/CN2019/092666, dated Mar. 23, 2020, 9 pages.

*Primary Examiner* — Pedro J Cuevas
(74) *Attorney, Agent, or Firm* — Xsensus LLP

(57) ABSTRACT

The present invention discloses a mobile power generation system. A power generation apparatus is respectively quickly connected, through expansion joints, to an intake assembly and an exhaust duct which are separately transported, to implement the quick installation and connection of the power generation system at the fracturing operation site. Two conveyances are respectively provided for the intake assembly and the exhaust duct to achieve more flexible adjustment during connection. While the position of the power generation apparatus is fixed, the intake assembly is moved to connect to an intake chamber of the power generation apparatus, and the exhaust duct is moved to connect to an exhaust collector of the power generation apparatus.

7 Claims, 3 Drawing Sheets

(51) Int. Cl.
  *F01D 25/30* (2006.01)
  *H02K 7/18* (2006.01)
(58) Field of Classification Search
  USPC .......................... 290/1 A, 1 R, 4 R; 60/797
  See application file for complete search history.

(56) References Cited

U.S. PATENT DOCUMENTS

| | | | | |
|---|---|---|---|---|
| 4,136,432 A * | 1/1979 | Melley, Jr. | ................ | B60P 3/00 |
| | | | | 29/469 |
| 4,992,669 A * | 2/1991 | Parmley | ................... | F01B 1/12 |
| | | | | 123/2 |
| 5,517,822 A * | 5/1996 | Haws | ................... | F01K 17/025 |
| | | | | 60/618 |
| 6,334,746 B1 * | 1/2002 | Nguyen | ................... | F16M 3/00 |
| | | | | 410/156 |
| 6,765,304 B2 * | 7/2004 | Baten | ..................... | F02B 63/04 |
| | | | | 290/1 A |
| 6,786,051 B2 * | 9/2004 | Kristich et al. | ........... | F02C 6/00 |
| | | | | 60/796 |
| 7,081,682 B2 * | 7/2006 | Campion | ................ | F02B 63/04 |
| | | | | 123/2 |
| 7,608,934 B1 * | 10/2009 | Hunter | ................... | F02D 25/00 |
| | | | | 290/4 R |
| 7,619,319 B1 * | 11/2009 | Hunter | ................... | B60L 53/30 |
| | | | | 290/4 R |
| 8,221,626 B2 * | 7/2012 | Sassow | ................... | C02F 3/006 |
| | | | | 210/603 |
| 8,294,285 B2 * | 10/2012 | Hunter | ................... | B60L 1/006 |
| | | | | 290/1 R |
| 8,294,286 B2 * | 10/2012 | Hunter | ................... | F03G 7/08 |
| | | | | 290/1 R |
| 8,465,645 B2 * | 6/2013 | Sassow | ................... | C05F 9/02 |
| | | | | 210/603 |
| 8,495,869 B2 * | 7/2013 | Beissler | ................... | F01N 13/00 |
| | | | | 60/274 |
| 8,587,136 B2 * | 11/2013 | Williams | ................ | F01K 13/00 |
| | | | | 290/1 A |
| 8,680,728 B2 * | 3/2014 | Errera | ..................... | F01N 5/04 |
| | | | | 123/2 |
| 9,085,996 B2 * | 7/2015 | Ponnuraj | ................ | F01D 25/305 |
| 9,272,930 B2 * | 3/2016 | Sassow | ................... | C12M 23/36 |
| 9,376,801 B1 * | 6/2016 | Warren | ................... | E04H 5/00 |
| 9,376,928 B2 * | 6/2016 | Lazzari | ................... | F01D 15/10 |
| 9,534,370 B2 * | 1/2017 | Kokoschka | ........... | F01N 3/0205 |
| 9,534,473 B2 * | 1/2017 | Morris | ................... | F01D 25/30 |
| 9,562,420 B2 * | 2/2017 | Morris | ................... | E21B 43/26 |
| 9,682,880 B2 * | 6/2017 | Sassow | ..................... | C05F 9/00 |
| 10,030,579 B2 * | 7/2018 | Austin | ..................... | F16M 5/00 |
| 10,060,349 B2 * | 8/2018 | Morales Ivarez | ......... | F02C 7/00 |
| 10,184,397 B2 * | 1/2019 | Austin | ..................... | F02C 6/00 |
| 10,337,402 B2 * | 7/2019 | Austin | ..................... | F16M 5/00 |
| 10,371,012 B2 * | 8/2019 | Davis | ..................... | F02B 63/047 |
| 10,374,485 B2 * | 8/2019 | Morris | ..................... | F02C 7/055 |
| 10,384,969 B2 * | 8/2019 | Sassow | ..................... | C12M 23/36 |
| 10,458,334 B2 * | 10/2019 | Davis | ..................... | F01D 15/10 |
| 10,611,655 B2 * | 4/2020 | Sassow | ................... | C05F 17/15 |
| 10,634,029 B2 * | 4/2020 | Czarnecki | ............. | F02B 63/044 |
| 10,784,658 B2 * | 9/2020 | Rochin Machado | .... | H02B 1/01 |
| 2003/0057704 A1 * | 3/2003 | Baten | ..................... | F02B 63/04 |
| | | | | 290/3 |
| 2003/0079479 A1 * | 5/2003 | Kristich | ................. | F01D 25/28 |
| | | | | 60/797 |
| 2004/0265198 A1 * | 12/2004 | Biswas | ............. | B01D 53/8631 |
| | | | | 423/210 |
| 2006/0080971 A1 * | 4/2006 | Smith | ................... | F01D 21/003 |
| | | | | 60/797 |
| 2009/0322096 A1 * | 12/2009 | Errera | ..................... | F02B 63/04 |
| | | | | 290/1 A |
| 2013/0026765 A1 * | 1/2013 | Errera | ..................... | F02B 63/04 |
| | | | | 290/1 A |
| 2014/0157778 A1 * | 6/2014 | Ponnuraj | ................... | F02C 7/00 |
| | | | | 60/694 |
| 2014/0285005 A1 * | 9/2014 | Casteel | ................... | H02S 10/20 |
| | | | | 307/23 |
| 2015/0116934 A1 * | 4/2015 | Lazzari | ................... | F01D 15/10 |
| | | | | 361/692 |
| 2016/0102615 A1 | 4/2016 | Trippold et al. | | |
| 2016/0177678 A1 * | 6/2016 | Morris | ..................... | F02C 7/055 |
| | | | | 60/772 |
| 2017/0104389 A1 * | 4/2017 | Morris | ..................... | F02C 7/055 |
| 2018/0080376 A1 * | 3/2018 | Austin | ..................... | F16M 3/00 |
| 2018/0080377 A1 * | 3/2018 | Austin | ..................... | B60D 1/00 |
| 2018/0328279 A1 * | 11/2018 | Austin | ................... | B62D 53/00 |
| 2019/0063262 A1 * | 2/2019 | Davis | ..................... | F01D 15/10 |
| 2019/0063263 A1 * | 2/2019 | Davis | ..................... | H02K 9/04 |
| 2019/0063308 A1 * | 2/2019 | Davis | ..................... | F02B 63/047 |
| 2019/0063309 A1 * | 2/2019 | Davis | ..................... | H02K 7/1823 |
| 2019/0063326 A1 * | 2/2019 | Davis | ..................... | F02C 6/14 |
| 2019/0063341 A1 * | 2/2019 | Davis | ..................... | F01D 15/10 |
| 2019/0067991 A1 * | 2/2019 | Davis | ..................... | H02K 7/1823 |
| 2019/0068026 A1 * | 2/2019 | Davis | ..................... | F02C 7/20 |
| 2019/0356199 A1 * | 11/2019 | Morris | ..................... | F02C 7/32 |
| 2020/0083676 A1 * | 3/2020 | Rochin Machado | .... | H02B 1/01 |
| 2020/0408144 A1 * | 12/2020 | Feng | ..................... | F02B 63/047 |
| 2020/0408147 A1 * | 12/2020 | Zhang | ..................... | F02C 6/00 |
| 2020/0408149 A1 * | 12/2020 | Li | ............................. | F02C 7/20 |

* cited by examiner

MOBILE POWER GENERATION SYSTEM

TECHNICAL FIELD

The present invention relates to the field of power generation technologies, and specifically to a mobile power generation system.

BACKGROUND

The oil and gas industry generally adopts hydraulic fracturing to promote the production of hydrocarbon wells (for example, oil or gas wells). Conventional fracturing equipment generally has the problems of occupying a large area, causing severe environmental pollution and so on, failing to satisfy the increasingly serious environmental requirements and the requirements on the area occupied by well-site operations.

A complete set of electric drive fracturing equipment will effectively reduce the discharge of environmental pollutants, the occupied area, noise and the operation and maintenance costs. With the use of a complete set of electric drive fracturing equipment and the continuous increase of the power of electric drive fracturing equipment, higher requirements are imposed on power supply at the operation site. At the well-site, the power supply for fracturing equipment generally cannot be realized by using a power grid. Moreover, the fracturing operation has the characteristic of short operation cycle, and fracturing equipment needs to be moved among different well-sites. Generally, because various parts of a power supply system require different assembly, transportation and installation methods, the installation time of the power supply system will be up to half to one month.

Therefore, how to provide a mobile power supply system which can be quickly and conveniently installed at the electric drive fracturing operation site is currently a great challenge for electric drive fracturing operations.

SUMMARY

To overcome the defects of the prior art, an objective of the present invention is to provide a mobile power generation system. A power generation apparatus is respectively quickly connected, through expansion joints, to an intake assembly and an exhaust duct which are separately transported, to implement the quick installation and connection of the power generation system at the fracturing operation site. Two conveyances are respectively provided for the intake assembly and the exhaust duct to achieve more flexible adjustment during connection. While the position of the power generation apparatus is fixed, the intake assembly is moved to connect to an intake chamber of the power generation apparatus, and the exhaust duct is moved to connect to an exhaust collector of the power generation apparatus.

The objective of the present invention is achieved by the following technical measures: A mobile power generation system, including an intake transport apparatus, an exhaust transport apparatus and a power generation transport apparatus;

the power generation transport apparatus includes a gas turbine, an intake chamber, an exhaust collector, a generator and a first conveyance;

the intake transport apparatus includes an intake assembly and a second conveyance, the intake assembly is configured to provide combustion air and gas-turbine-chamber ventilation air;

the exhaust transport apparatus includes an exhaust duct and a third conveyance; the intake transport apparatus and exhaust transport apparatus are connected to one side of the power generation transport apparatus.

Further, the power generation transport apparatus further includes an electric power unit and a control system, the electric power unit is configured to output electric power from the generator, and the control system includes a gas turbine control unit and a generator control unit.

Further, the intake transport apparatus and the exhaust transport apparatus are connected to at least one side of the power generation transport apparatus through expansion joints, respectively.

Further, the intake transport apparatus and the exhaust transport apparatus are disposed on the same side, opposite sides or adjacent sides.

Further, the first conveyance, the second conveyance and the third conveyance are each at least one of a trailer, a truck, a skid or a barge.

Further, the exhaust duct is horizontally disposed on exhaust transport apparatus during transportation.

Further, when in working state, the exhaust duct is hydraulically rotated to a vertical direction of the exhaust transport apparatus.

Further, the power generation transport apparatus further includes an auxiliary system, the auxiliary system is configured to assist in the operation of the power generation transport apparatus.

Further, the intake transport apparatus further includes an intake hydraulic shifter unit. During installation and connection, the intake hydraulic shifter unit is configured to adjust relative positions of the intake transport apparatus and the power generation transport apparatus.

Further, the exhaust transport apparatus further includes an exhaust hydraulic shifter unit. During installation and connection, the exhaust hydraulic shifter unit is configured to adjust relative positions of the exhaust transport apparatus and the power generation transport apparatus.

Compared with the prior art, the present invention has the following beneficial effects: Three conveyances are respectively arranged for the power generation apparatus, the exhaust duct, and the intake assembly, and are connected to each other through expansion joints, to implement the quick installation and connection of the power generation system at the fracturing operation site. Two conveyances are respectively provided for the intake assembly and the exhaust duct to achieve more flexible adjustment during connection. While the position of the power generation apparatus is fixed, the intake assembly is moved to connect to the intake chamber of the power generation apparatus, and the exhaust duct is moved to connect to the exhaust collector of the power generation apparatus.

The present invention will be described in detail below with reference to the accompanying drawings and specific implementations.

Figure 1:
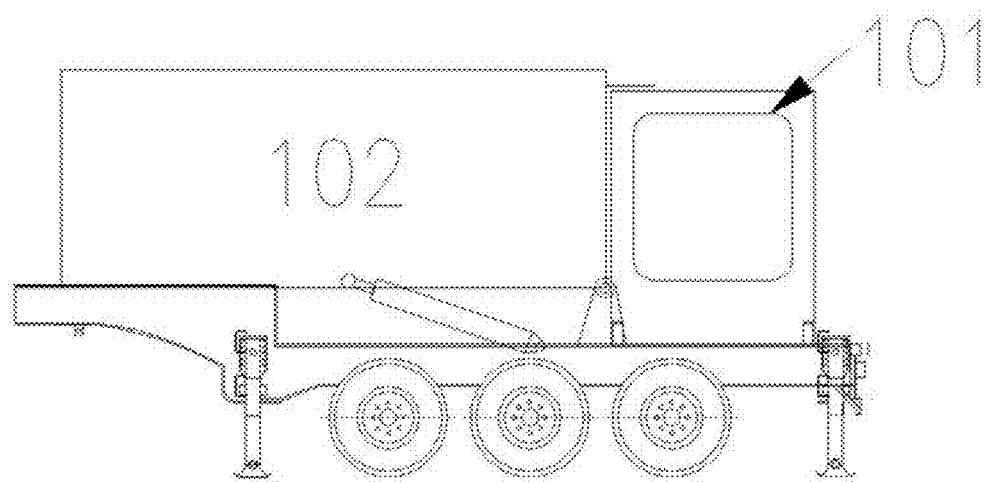
FIG. 1 is a schematic diagram of an exhaust transport apparatus in transport state.

Wherein, 100. exhaust transport apparatus, 101. exhaust expansion joint, 102. exhaust duct, 200. intake transport apparatus, 201. gas-turbine-chamber ventilation expansion joint, 202. combustion expansion joint, 203. intake assembly, 300. power generation transport apparatus, 301. noise reduction room, 302. gas turbine chamber, 303. generator chamber, 304. control chamber, 305. electric power unit, 306. control system, 307. generator, 308. exhaust collector, 309. gas turbine, 310. intake chamber.

DESCRIPTION OF THE EMBODIMENTS

As used herein, the term "conveyance" refers to any transportation unit, the first conveyance, the second conveyance and the third conveyance are each at least one of a trailer, a truck, a skid or a barge.

A mobile power generation system includes an intake transport apparatus 200, an exhaust transport apparatus 100 and a power generation transport apparatus 300. The power generation transport apparatus 300 includes a gas turbine 309, an intake chamber 310, an exhaust collector 308, a generator 307, an electric power unit 305, a control system 306 and a first conveyance.

The intake transport apparatus 200 includes an intake assembly 203 and a second conveyance, the intake assembly 203 is configured to provide combustion air and gas-turbine-chamber ventilation air.

The exhaust transport apparatus 100 includes an exhaust duct 102 and a third conveyance. The intake transport apparatus 200 and the exhaust transport apparatus 100 are connected to one side of the power generation transport apparatus 300. Plentiful and inexpensive hydrocarbon fuels (for example, natural gas) at the oil and gas well-site are used as fuels for the gas turbine 309, which transforms chemical energy of hydrocarbon fuels to mechanical energy. Then the generator 307 transforms the mechanical energy into electric energy, thus achieving an efficient, stable, environmentally friendly, mobile supply of electric energy to the electric drive fracturing operation site. The mobile power generation system does not require any additional auxiliary equipment (for example, crane), thereby effectively reducing the installation time. The intake transport apparatus 200 and the exhaust transport apparatus 100 are small in volume and can be transported in multiple ways, and can be easily aligned and mounted. The intake transport apparatus 200 and the exhaust transport apparatus 100 can be mounted at the same time, thereby reducing the installation time. The system can be quickly assembled together to generate electric power after being transferred to another site, thereby satisfying the electric power requirements of fracturing operations.

The intake transport apparatus 200 and the exhaust transport apparatus 100 are connected to at least one side of the power generation transport apparatus 300 through expansion joints, respectively. According to different interface orientations of the intake chamber 310 on the power generation transport apparatus 300, the intake transport apparatus 200 and the exhaust transport apparatus 100 may be disposed on the same side, opposite sides or adjacent sides.

The exhaust duct 102 is horizontally disposed on the exhaust transport apparatus 100 during transportation.

When in working state, the exhaust duct 102 is hydraulically rotated to a vertical direction of the exhaust transport apparatus 100.

The power generation transport apparatus 300 further includes an auxiliary system. The auxiliary system is configured to assist in the operation of the power generation transport apparatus 300.

The intake transport apparatus 200 further includes an intake hydraulic shifter unit. During installation and connection, the intake hydraulic shifter unit is configured to adjust relative positions of the intake transport apparatus 200 and the power generation transport apparatus 300.

The exhaust transport apparatus 100 further includes an exhaust hydraulic shifter unit. During installation and connection, the exhaust hydraulic shifter unit is configured to adjust relative positions of the exhaust transport apparatus 100 and the power generation transport apparatus 300.

Figure 2:
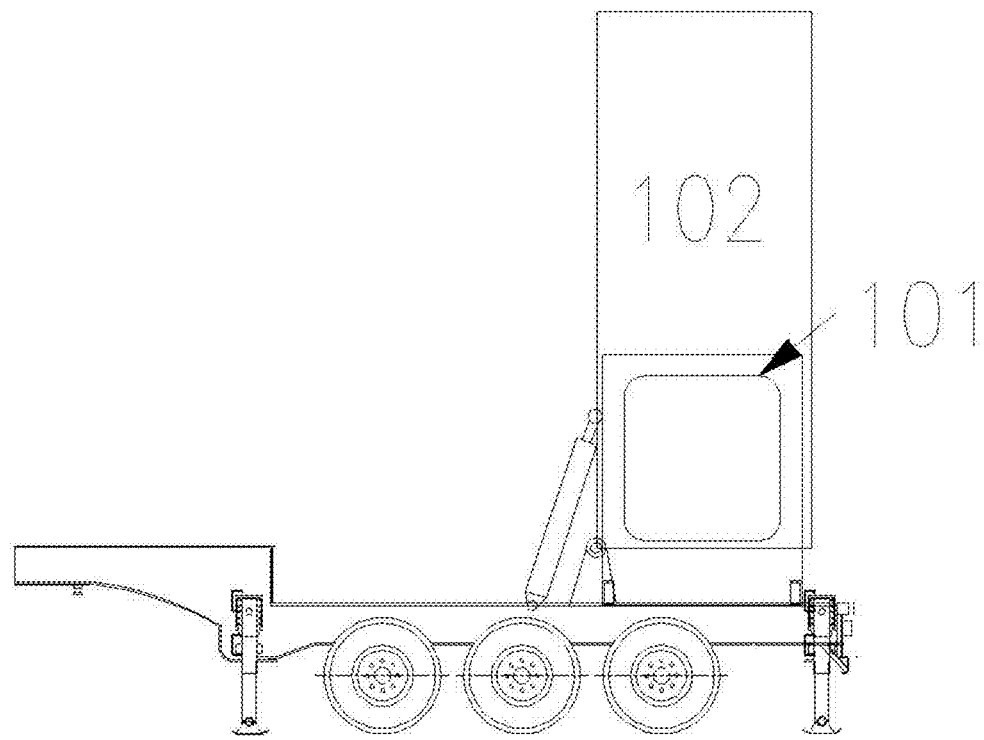
FIG. 2 is a schematic diagram of an exhaust transport apparatus in working state.

FIG. 1 and FIG. 2 are schematic structural diagrams of the exhaust transport apparatus. The exhaust duct 102 and the exhaust expansion joint 101 are disposed on the third conveyance. The exhaust duct 102 includes an exhaust silencer, an exhaust stack and an exhaust elbow. The exhaust duct 102 is connected to the power generation transport apparatus 300 through the exhaust expansion joint 101. The exhaust expansion joint 101, the exhaust elbow, the exhaust silencer and the exhaust stack are sequentially connected. During transportation, the exhaust duct 102 is located at a horizontal position (as shown in FIG. 1). In working state, the exhaust duct 102 is hydraulically or otherwise rotated to a vertical position (as shown in FIG. 2).

Figure 3:
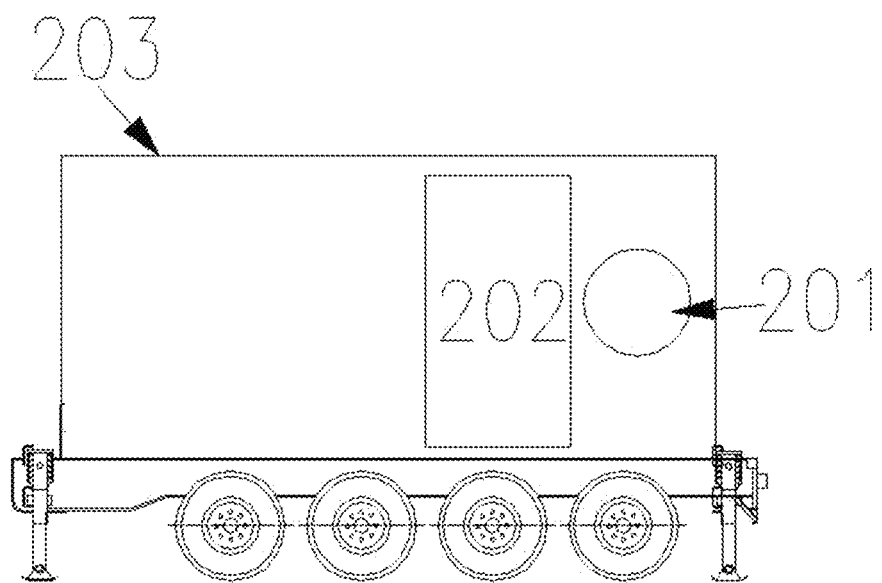
FIG. 3 is a schematic diagram of an intake transport apparatus.

FIG. 3 is a schematic structural diagram of the intake transport apparatus. The intake assembly 203 and the intake expansion joint are disposed on the second conveyance. The intake assembly 203 is configured to provide combustion air and gas-turbine-chamber ventilation air. The intake assembly 203 includes an intake filter and an intake silencer. The intake assembly 203 further includes a ventilation fan. The intake expansion joint includes a combustion expansion joint 202 and a gas-turbine-chamber ventilation expansion joint 201.

Figure 4:
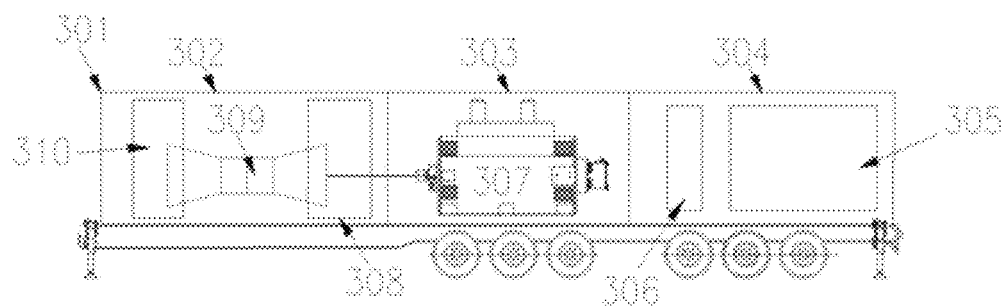
FIG. 4 is a schematic diagram of a power generation transport apparatus.

FIG. 4 is a schematic structural diagram of the power generation transport apparatus. A noise reduction room 301 is mounted on the power generation transport apparatus 300. The noise reduction room 301 mainly includes three parts: a gas turbine chamber 302, a generator chamber 303 and a control chamber 304. In the gas turbine chamber 302, the gas turbine 309 which transforms chemical energy of hydrocarbon fuels to mechanical energy, the intake chamber 310 configured to guide combustion air, and the exhaust collector 308 configured to collect exhaust gas and guide the exhaust gas to the exhaust duct 102 are mainly mounted. In the generator chamber 303, the generator 307 which transforms the mechanical energy of the gas turbine 309 into electric energy is mainly mounted. In the control chamber 304, the electric power unit 305 and the control system 306 are mainly mounted. The electric power unit 305 is configured to output electric power from the generator 307. The control system 306 includes a gas turbine control unit and a generator control unit. The power generation transport apparatus 300 may further include an auxiliary system not shown in FIG. 3. The auxiliary system includes a lubrication system, a washing system, a fire fighting system, a starting system, and the like.

Figure 5:
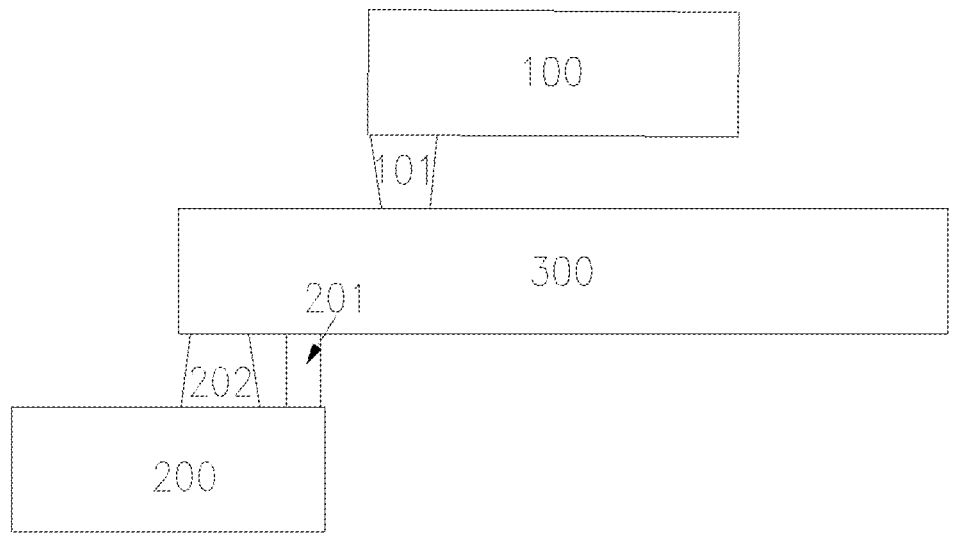
FIG. 5 is a schematic diagram of an overall structure of a mobile power generation system (first embodiment).
Figure 6:
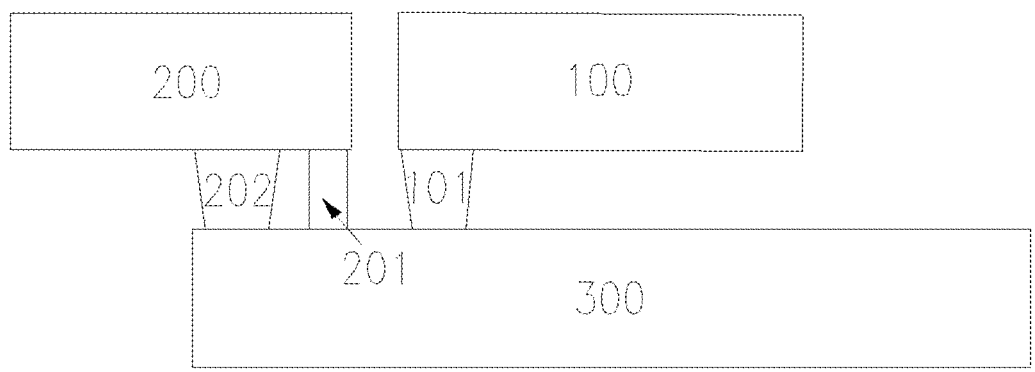
FIG. 6 is a schematic diagram of an overall structure of a mobile power generation system (second embodiment).
Figure 7:
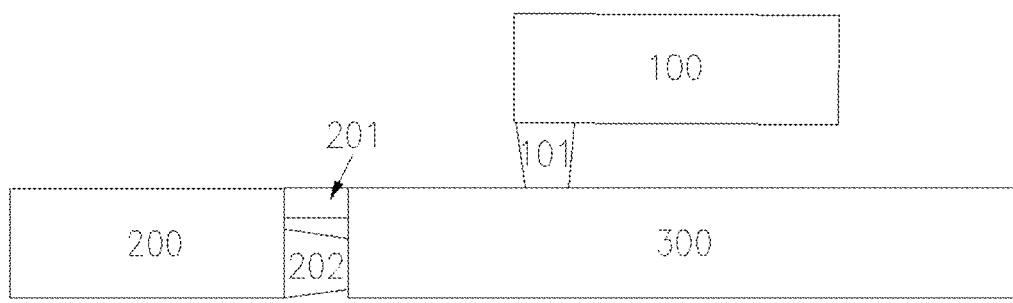
FIG. 7 is a schematic diagram of an overall structure of a mobile power generation system (third embodiment).

FIG. 5 to FIG. 7 are schematic structural diagrams of an overall structure of the mobile power generation system. As shown in FIG. 5, in a first embodiment, the exhaust transport apparatus 100 is located on one side of the power generation transport apparatus 300, and is connected to the exhaust collector 308 of the power generation transport apparatus 300 through the exhaust expansion joint 101, so as to discharge the exhaust gas to the atmosphere through the exhaust duct 102. The intake transport apparatus 200 is located opposite to the exhaust transport apparatus 100. The intake transport apparatus 200 is connected to the power generation transport apparatus 300 through the intake expansion joint, to be specific, connected through the combustion expansion joint 202 and the gas-turbine-chamber ventilation expansion joint 201, so as to provide combustion air and gas-turbine-chamber ventilation air for the power generation transport apparatus 300. As shown in FIG. 6, in a second embodiment, the intake transport apparatus 200 is located on the same side as the exhaust transport apparatus 100. As shown in FIG. 7, in a third embodiment, the intake transport apparatus 200 and the exhaust transport apparatus 100 are located at two adjacent sides of the power generation transport apparatus 300.

A method of the mobile power generation system includes the following steps:

1) mounting, on the first conveyance, the gas turbine 309, the intake chamber 310, the exhaust collector 308, the generator 307, the electric power unit 305 and the control system 306;

2) mounting, on the second conveyance, the intake expansion joint and the intake assembly 203 configured to provide combustion air and gas-turbine-chamber ventilation air, and connecting the intake expansion joint to the intake assembly 203;

3) mounting the exhaust duct 102 and the exhaust expansion joint 101 on the third conveyance;

4) moving the first conveyance to a designated position at a user site, and moving the second conveyance and the third conveyance to predetermined positions, then adjusting horizontal and vertical positions of the second conveyance by using the intake hydraulic shifter unit to connect the intake expansion joint to the intake chamber 310 on the first conveyance, and adjusting horizontal and vertical positions of the third conveyance by using the exhaust hydraulic shifter unit to connect the exhaust expansion joint 101 to the exhaust collector 308 on the first conveyance; and 5) rotating the exhaust duct 102 on the third conveyance from the horizontal position to the vertical direction, connecting the exhaust duct 102 to the exhaust expansion joint 101, and discharging exhaust gas to the atmosphere through the exhaust duct 102.

During connection, the exhaust expansion joint 101 can be stretched toward the exhaust collector 308, and the intake expansion joint can be stretched toward the intake chamber 310 and the gas turbine chamber 302. After operation is completed and the system needs to be disassembled at the user site, the exhaust expansion joint 101 can be retracted away from the exhaust collector 308, and the intake expansion joint can be retracted away from the intake chamber 310 and the gas turbine chamber 302.

The intake hydraulic shifter unit and the exhaust hydraulic shifter unit have the same structure including supporting legs, outriggers, a vertical hydraulic cylinder and a horizontal hydraulic cylinder which can implement movement of the conveyance. The supporting legs are connected to the outriggers. The vertical hydraulic cylinder is configured to implement vertical movement of the supporting legs. The horizontal hydraulic cylinder is configured to implement horizontal movement of the supporting legs. The intake hydraulic shifter unit and the exhaust hydraulic shifter unit lower the requirements on the positioning precision of the second conveyance and the third conveyance, thereby lowering the installation difficulty and reducing the installation time.

What is claimed is:

1. A mobile power generation system, comprising an intake transport apparatus, an exhaust transport apparatus and a power generation transport apparatus; wherein the power generation transport apparatus comprises a gas turbine, an intake chamber, an exhaust collector, a generator and a first conveyance;

the intake transport apparatus comprises an intake assembly and a second conveyance, the intake assembly is configured to provide combustion air and gas-turbine-chamber ventilation air;

the exhaust transport apparatus comprises an exhaust duct, an exhaust expansion joint, and a third conveyance; the intake transport apparatus and the exhaust transport apparatus are connected to one side of the power generation transport apparatus, and the exhaust duct is horizontally disposed on the exhaust transport apparatus during transportation, and the exhaust duct is hydraulically rotated to a vertical direction of the exhaust transport apparatus when in working state, wherein the intake transport apparatus further comprises an intake hydraulic shifter unit, which is configured to adjust relative positions of the intake transport apparatus and the power generation transport apparatus so as to connect the intake assembly of the intake transport apparatus to the intake chamber of the power generation apparatus in the working state, and the exhaust transport apparatus further comprises an exhaust hydraulic shifter unit, which is configured to adjust relative positions of the exhaust transport apparatus and the power generation transport apparatus so as to connect the exhaust expansion joint of the exhaust transport apparatus to the exhaust collector of the power generation apparatus in the working state.

2. The mobile power generation system according to claim 1, wherein the power generation transport apparatus further comprises an electric power unit and a control system, the electric power unit is configured to output electric power from the generator, the control system comprises a gas turbine control unit and a generator control unit.

3. The mobile power generation system according to claim 1, wherein the intake transport apparatus and the exhaust transport apparatus are connected to at least one side of the power generation transport apparatus through expansion joints, respectively.

4. The mobile power generation system according to claim 2, wherein the intake transport apparatus and the exhaust transport apparatus are disposed on the same side, opposite sides or adjacent sides.

5. The mobile power generation system according to claim 1, wherein the power generation transport apparatus further comprises an auxiliary system, and the gas turbine, the intake chamber, the exhaust collector, the generator, and the auxiliary system are on the first conveyance.

6. The mobile power generation system according to claim 1, wherein the auxiliary system comprises at least one selected from the group consisting of a lubrication system, a washing system, a fire fighting system, and a starting system.

7. The mobile power generation system according to claim 1, wherein the exhaust duct is hydraulically rotated by a single hydraulic piston to a vertical direction of the exhaust transport apparatus when in working state.

* * * * *